(12) United States Patent
Qin et al.

(10) Patent No.: US 11,774,061 B2
(45) Date of Patent: Oct. 3, 2023

(54) INJECTION MOLDED COMPONENT

(71) Applicant: SIGNIFY HOLDING B.V., Eindhoven (NL)

(72) Inventors: Hexi Qin, Shanghai (CN); Yuhang Liu, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/773,581

(22) PCT Filed: Nov. 2, 2020

(86) PCT No.: PCT/EP2020/080675
§ 371 (c)(1),
(2) Date: Apr. 29, 2022

(87) PCT Pub. No.: WO2021/089479
PCT Pub. Date: May 14, 2021

(65) Prior Publication Data
US 2022/0390086 A1    Dec. 8, 2022

(30) Foreign Application Priority Data

Nov. 4, 2019 (WO) ................ PCT/CN2019/115389
Feb. 13, 2020 (EP) ...................................... 20157225

(51) Int. Cl.
| | | |
|---|---|---|
| F21V 5/00 | (2018.01) | |
| B29D 11/00 | (2006.01) | |
| F21Y 115/10 | (2016.01) | |
| B29C 45/26 | (2006.01) | |

(52) U.S. Cl.
CPC ........ *F21V 5/007* (2013.01); *B29D 11/00298* (2013.01); *B29C 45/263* (2013.01); *B29C 2945/76103* (2013.01); *F21Y 2115/10* (2016.08)

(58) Field of Classification Search
CPC ............. F21V 5/007; B29D 11/009298; B29C 2945/76103
See application file for complete search history.

(56) References Cited

U.S. PATENT DOCUMENTS

| | | | |
|---|---|---|---|
| 4,691,830 A | 9/1987 | Ahl et al. | |
| 7,083,343 B2* | 8/2006 | Tseng | B29C 33/424 400/490 |
| 2017/0291343 A1* | 10/2017 | Uchiyama | G01N 21/88 |

FOREIGN PATENT DOCUMENTS

| | | |
|---|---|---|
| DE | 102017003001 A1 | 10/2017 |
| JP | S57103811 A | 6/1982 |
| JP | H0267118 A | 3/1990 |

(Continued)

OTHER PUBLICATIONS

D. Mathivanan, et al, "Minimization of sink mark defects in injection molding process—Taguchi approach", International Journal of Engineering, Science and Technology, vol. 2, No. 2, 2010, pp. 13-22.

(Continued)

*Primary Examiner* — Evan P Dzierzynski
*Assistant Examiner* — Nathaniel J Lee

(57) ABSTRACT

An injection molded component has a functional portion and a quality control portion. The quality control portion comprises a set of protrusions which are adapted to distort visibly in response to injection molding shrinkage, thereby to enable visual quality control inspection.

14 Claims, 3 Drawing Sheets

(56) References Cited

FOREIGN PATENT DOCUMENTS

| | | |
|---|---|---|
| JP | H03114814 A | 5/1991 |
| JP | 2000263616 A | 9/2000 |
| JP | 2005138334 A | 6/2005 |

OTHER PUBLICATIONS

Dieter P. Gruber, et al, "Measurement of the visual perceptibility of sink marks on injection molding parts by a new fast processing model", Polymer Testing 33 (2014), pp. 7-12.

* cited by examiner

INJECTION MOLDED COMPONENT

CROSS-REFERENCE TO PRIOR APPLICATIONS

This application is the U.S. National Phase application under 35 U.S.C. § 371 of International Application No. PCT/EP2020/080675, filed on Nov. 2, 2020, which claims the benefit of European Patent Application No. 20157225.2, filed on Feb. 13, 2020, which claims the benefit of Chinese Patent Application No. PCT/CN2019/115389, filed on Nov. 4, 2019. These applications are hereby incorporated by reference herein.

FIELD OF THE INVENTION

This invention relates generally to injection molded components. It relates in particular to shrinkage which occurs during the molding process.

BACKGROUND OF THE INVENTION

Shrinkage during injection molding is a well known issue. Indeed, it is known to design molds such that the shrinkage is taken into account and the finally produced product has the desired form despite shrinkage during the cooling and solidification phase of the injection molding process.

Some components require particularly good quality and repeatability of their shape, and this becomes increasingly difficult with increasing size.

One example for which the shape of the product is critical to the performance of the product is an injection molded lens or lens array. Such lenses or lens arrays are for example applied to LED modules in order to provide uniform illumination of a planar surface. Of course, many other beam shaping optics may be designed as injection molded components.

One approach to achieve a planar surface illumination is to use a so-called batwing intensity distribution (also referred to as a wide beam intensity distribution). The term batwing refers to a highly peaked shape of the intensity distribution in a polar plot.

The batwing light distribution allows for a uniform illumination of a planar surface for example even up to a 140° beam angle. Such light distributions and hence lens designs are used for example in street lighting and wall washer applications. In these examples, the batwing distribution targets a planar surface in the far field: the illuminated surface is positioned at a distance much larger than the light module dimensions.

FIG. 1 shows an example of a batwing intensity distribution as a polar plot. The two wings 10, 12 in this example have a peak intensity at 60 degrees each side of the normal, and the aim is to provide a uniform surface illumination over the full 120 degree range. The intensity is higher at the grazing angles because the surface area being illuminated per unit angle increases steeply.

The ring 14 is the light intensity in a perpendicular direction. For a rotationally symmetric light distribution this would be a batwing distribution as well. For a linear light source, it is for example a circle (i.e. Lambertian), distribution.

To create the desired batwing profile from a LED, an optical component is required to compensate the well-known cosine fourth law which applies to a Lambertian point source (by which illuminance falls following a $\cos^4 \vartheta$ function). The optical design thus needs to change the Lambertian intensity distribution from a LED output intensity distribution into the batwing distribution.

There are two known designs of lens capable of changing a Lambertian intensity distribution into a batwing intensity distribution.

A first example is a so-called peanut design, a second example is a so-called bubble optic.

By way of example, a peanut lens design 20 is shown in FIG. 2 (from above and from the side), and an array of such lenses is shown in FIG. 3.

Each lens 20 in FIG. 3 is provided over a LED 30 of a LED array, forming a luminaire, such as a road lighting luminaire. The surface changing the Lambertian distribution into a batwing is the outer lens surface for the peanut lens, while for a bubble optic it is the inner surface.

It is known to use injection molding for lenses and arrays of lenses of this type. However, when making large lens plates, such as shown in FIG. 3, there is a risk of injection molding shrinkage at the optical surface. This will affect the light distribution accuracy.

A known procedure to monitor the injection molding process is that when the light distribution is found to have deteriorated, and hence accuracy of the optical surface is suspected, a laser scan or 3D scan of the product is conducted. This of course has a high cost.

There is therefore a need for a low cost solution that enables the accuracy of an injection molding process to be monitored, in particular so that defects or issues can be identified as quickly as possible, so that the production and sale of sub-standard products can be prevented. However, the number of photometric measurements should be kept to a minimum as it is not practical in a mass production environment to perform detailed optical analytical testing on large numbers of manufactured products.

US20170291343A1 discloses a molding system capable of detecting an abnormality for each cavity.

DE102017003001A1 discloses an injection molding system includes an image storage determination unit configured to determine whether to store an image of the molded product corresponding to a physical quantity, according to the physical quantity obtained by a physical quantity acquisition unit and a condition set by an image storage condition setting unit, and store the image in accordance with the determination result.

SUMMARY OF THE INVENTION

The invention is defined by the claims.

According to examples in accordance with an aspect of the invention, there is provided an injection molded component, comprising:
a functional portion; and
a quality control portion,
wherein the quality control portion comprises at least one protrusion which is adapted to distort visibly in response to injection molding shrinkage, thereby to enable visual quality control inspection.

By providing a quality control portion for visual inspection, a large number of components (or even each component) may be inspected with low cost. Any change in the quality of the injection molding process can be monitored by visual inspection of the at least one protrusion. The protrusion may for example have a height which depends on the degree of shrinkage. Thus, as soon as a reduction in height is seen, an issue can be flagged. The protrusion for example has a dimension (i.e. width) smaller than any protrusion in the functional portion of the component.

This smallest dimension, in a direction parallel to a general plane of the component, perpendicular to the height direction, is termed the "thickness" in this document. Thus, the protrusions in the quality control portion have a thickness which is less than the thickness of features in the functional portion (with a corresponding height to the protrusions).

The quality control portion does not interfere with the main functional purpose of the component, and it is not needed for the component to perform its main functional purpose. Thus, it is added as a dummy portion, with the sole purpose of implementing visual quality inspection.

The functional portion may have a smooth surface. Thus, changes in the injection molding process are difficult to observe based on a visual inspection of the functional portion. The functional portion is smooth in that the protrusions have a greater height than any features in the functional portion with corresponding thickness.

The functional portion for example comprises a lens element. A lens function has a critical dependency on the quality of the surface, which functions as a refractive index boundary. Thus, early identification of injection molding issues is important to prevent sub-standard products being manufactured.

The functional portion for example comprises an array of lens elements. These may be for mounting over a corresponding array of LEDs, with one lens providing beam shaping for a corresponding LED or sub-array of LEDs.

The component may comprise a set of protrusions of different susceptibility to deformation in response to injection molding shrinkage.

In this way, different levels of performance of the injection molding process may be identified, based on a visual inspection of the set of protrusions, and identification of which protrusions have visible flaws.

The set of protrusions for example comprise protrusions each of different size.

Differently sized protrusions will be more or less susceptible to shrinkage. They may for example be arranged in a row. There may be a set of protrusions with one of each different size, but there may be multiple examples of each different protrusion size. There may also be multiple sets of protrusions at different locations of the component, so that uniformity of the injection molding quality across the area of the component may be inspected.

The set of protrusions for example comprises at least 3 different protrusions of the same height but different thickness, for example 5 different protrusion designs of the same height but different thickness.

Visible shrinkage in different protrusions may then indicate different levels of severity. For example, different levels of shrinkage will have different impact on the end product, and different actions may be appropriate, such as performing photometric tests.

The different thicknesses for example each lie in the range 0.1 mm to 1.0 mm. There may for example be a set of thicknesses 0.2 mm, 0.4 mm, 0.6 mm, 0.8 mm and 1.0 mm.

The set of protrusions may comprise at least 2 different protrusions of the same thickness but different heights. The different heights may each lie in the range 1 mm to 5 mm.

For example, there may be a protrusion of 2 mm height (or a set of protrusions of different width, each with 2 mm height) and a protrusion of 4 mm height (or a set of protrusions of different width, each with 4 mm height).

The at least one protrusion for example comprises a column with circular or rectangular (e.g. square) cross section, in a plane perpendicular to a column height direction.

The overall component for example has an area greater than 100 cm². The larger the size of the component, the more prone the component is to shrinkage problems during injection molding.

The component for example comprises a lens plate for beam shaping LED light. For example, the lens plate may have a size of length 30 cm and width 15 cm, with 90 individual peanut lenses.

The invention also provides a luminaire comprising a housing, a LED light source arrangement mounted in the housing, and a lens plate for beam shaping of the LED light source arrangement light output, the lens plate comprising a component as defined above.

The invention also provides an injection molding method, comprising using an injection mold to form a component having:
- a functional portion; and
- a quality control portion,
- wherein the quality control portion comprises at least one protrusion which is adapted to distort visibly in response to injection molding shrinkage, thereby to enable visual quality control inspection.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
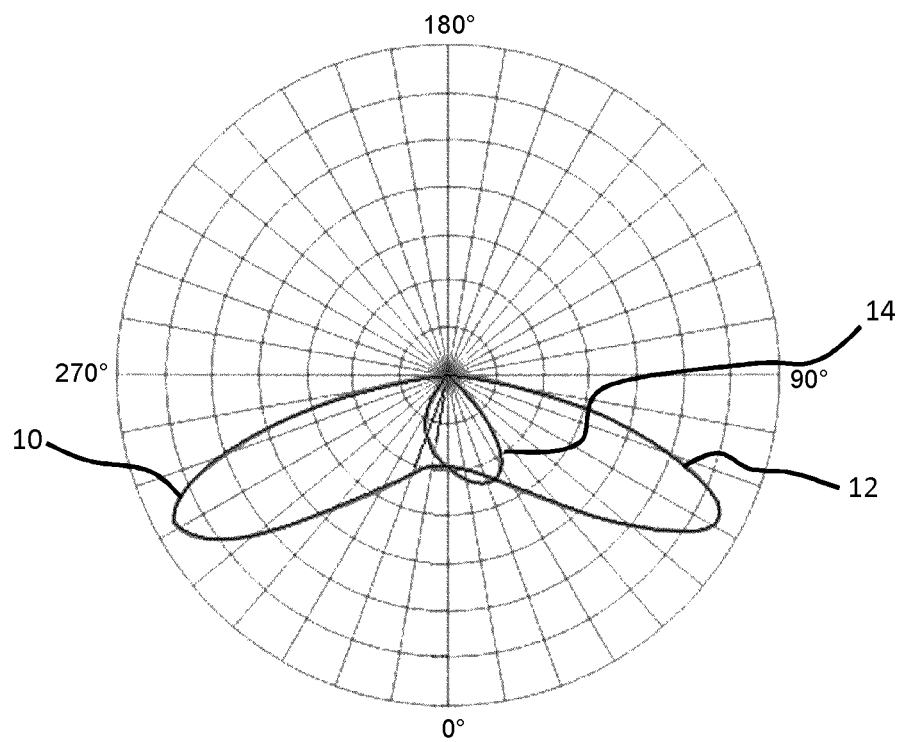
FIG. 1 shows an example of a batwing intensity distribution as a polar plot.
Figure 2:
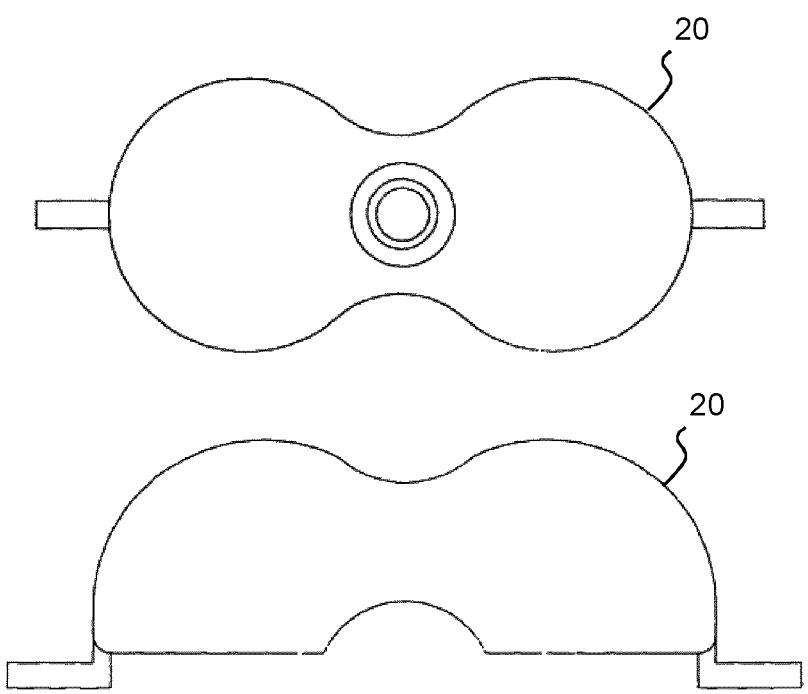
FIG. 2 shows a peanut lens design.
Figure 3:
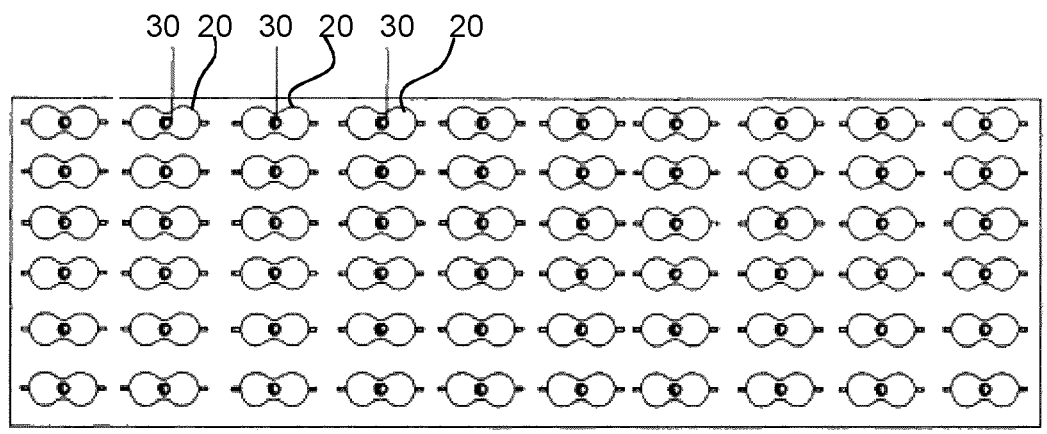
FIG. 3 shows an array of peanut lenses over a LED array.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an injection molded component, which has a functional portion and a quality control portion. The quality control portion comprises at least one protrusion which is adapted to distort visibly in response to injection molding shrinkage, thereby to enable visual quality control inspection.

Figure 4:
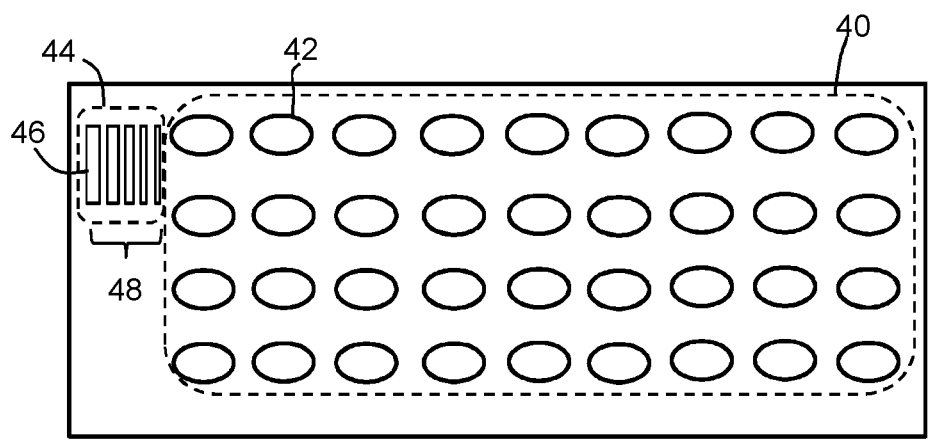
FIG. 4 shows component in accordance with an example of the invention in plan view.

FIG. 4 shows the component in plan view.

A functional portion 40 is the main body of the component, and it has a three dimensional shape for performing a desired function. The function may be optical, and for this purpose an array of lenses 42 is shown. The lenses have a generally smooth surface so that changes in the injection molding process are difficult to observe based on a visual inspection of the lenses. Each lens 42 is mounted over a corresponding LED (or group of LEDs) of an array of LEDs, and provides beam shaping for the associated LED or LED group.

The functional portion 40 for example comprises a lens plate of length 30 cm and width 15 cm, with 90 individual peanut lenses (only 36 are shown in the schematic representation of FIG. 4).

A quality control portion 44 is positioned in an area of the component which does not detract from its primary function, i.e. away from the functional portion 40.

The quality control portion is shown with exaggerated size in FIG. 4. It may for example occupy an area of dimensions less than 10 mm by less than 10 mm, whereas the overall component may have dimensions of tens of cm for forming a light output window of a luminaire.

There may be a set of quality control portions at different locations on the component. The quality control portions do not need to be located at an edge. They could instead be interspersed with the features of the functional portion (lenses in this example) if the space between those features is not playing a role of the functional portion.

The quality control portion comprises at least one protrusion 46 which is adapted to distort visibly in response to injection molding shrinkage, thereby to enable visual quality control inspection.

The example shows has a set 48 of 5 protrusions. The protrusions of the set have different susceptibility to deformation in response to injection molding shrinkage. They are all rectangular in plan view, but have different smallest dimension (i.e. the short rectangle side length). This is the dimension referred to as the thickness in this document.

It is this thickness which is of particular importance. The longer dimension is less important. Indeed the protrusions may be square (or other shape with a unity aspect ratio, such as any regular polygon or circle) or they may be elongate as shown in this example.

Table 1 below shows an example of possible dimensions of the 5 protrusions of the set 48.

TABLE 1

|  | length | width | height |
|---|---|---|---|
| Protrusion 1 | 3 mm | 0.2 mm | 2 mm |
| Protrusion 2 | 3 mm | 0.4 mm | 2 mm |
| Protrusion 3 | 3 mm | 0.6 mm | 2 mm |
| Protrusion 4 | 3 mm | 0.8 mm | 2 mm |
| Protrusion 5 | 3 mm | 1.0 mm | 2 mm |

In this example, the protrusions have a rectangular shape (when viewed from above) as shown in FIG. 4. The width progressively narrows, but the protrusions of the set all have the same height.

The different thicknesses for example generally lie in the range 0.1 mm to 1.0 mm. This example has 5 different protrusion designs, but there may be fewer (e.g. 3 or 4) or there may be more than 5. At the limit, there may be only one protrusion.

The important parameter is the smallest dimension of the protrusions, which is herein termed the "thickness". For a circular shape, this will be the diameter. For a rectangle, this will be the shortest side length, and for any other shape it will be the shortest distance between opposing sides.

The dimension of this thickness is selected such that the protrusion is susceptible to shrinkage such that it distorts visibly, thereby to enable visual quality control inspection.

Figure 5:
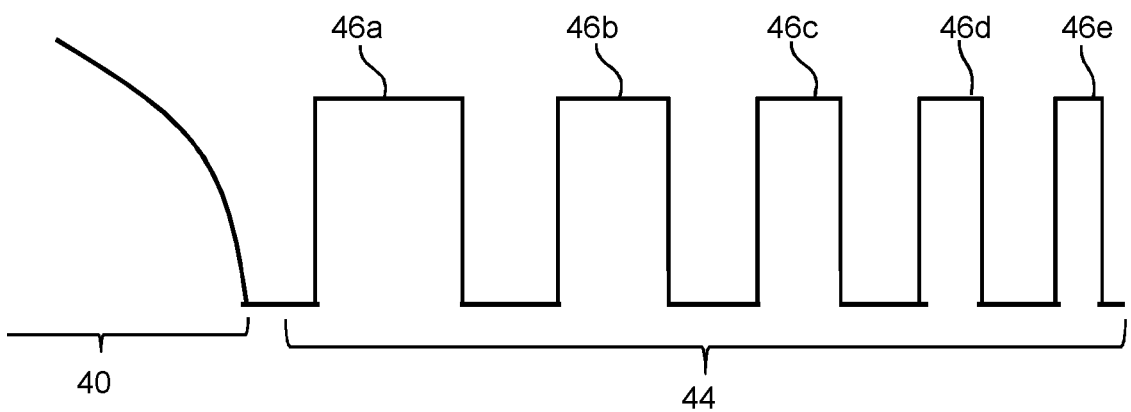
FIG. 5 shows the component of FIG. 4 in cross section.

FIG. 5 shows the component in cross section, and shows the five different protrusions 46a to 46e (not to scale). The functional portion 40 is smooth in that it has less abrupt features than the protrusions. The curved surface of a lens, and the light refraction on this surface, make visual identification of any shape variation very difficult. The protrusions are designed to have greater visual appearance of defined shrinkage issues than any part of the functional portion, including any non-smooth parts of the functional portion.

The protrusions for example comprise vertical features with a smaller thickness to height ratio than any features of the functional portion. The protrusion designs above have thickness to height ratio of 5:15, 4:15, 3:15, 2:15 and 1:15. More particularly, the protrusions comprise vertical features with a smaller thickness to height ratio than any features of the functional portion of corresponding height, e.g. with a height above a threshold such as 1 mm. The quality control portion thus has tall thin protrusions. A protrusion of a given thickness will have a greater height than any features in the functional portion with the a corresponding thickness.

There may instead, or additionally, be protrusions of different height.

For example, Table 2 shows a set of 10 protrusions, in two groups of 5. Each group has the same length and width dimensions as in Table 1, but there is one group of height 2 mm and one group of height 4 mm.

TABLE 2

|  | length | width | height |
|---|---|---|---|
| Protrusion 1 | 3 mm | 0.2 mm | 2 mm |
| Protrusion 2 | 3 mm | 0.4 mm | 2 mm |
| Protrusion 3 | 3 mm | 0.6 mm | 2 mm |
| Protrusion 4 | 3 mm | 0.8 mm | 2 mm |
| Protrusion 5 | 3 mm | 1.0 mm | 2 mm |
| Protrusion 6 | 3 mm | 0.2 mm | 4 mm |
| Protrusion 7 | 3 mm | 0.4 mm | 4 mm |
| Protrusion 8 | 3 mm | 0.6 mm | 4 mm |
| Protrusion 9 | 3 mm | 0.8 mm | 4 mm |
| Protrusion 10 | 3 mm | 1.0 mm | 4 mm |

The different heights may generally lie in the range 1 mm to 5 mm.

By providing a quality control portion 44 for visual inspection, a large number of components (or even each component) may be inspected with low cost. Any change in the quality of the injection molding process can be monitored by visual inspection of the at least one protrusion.

Figure 6:
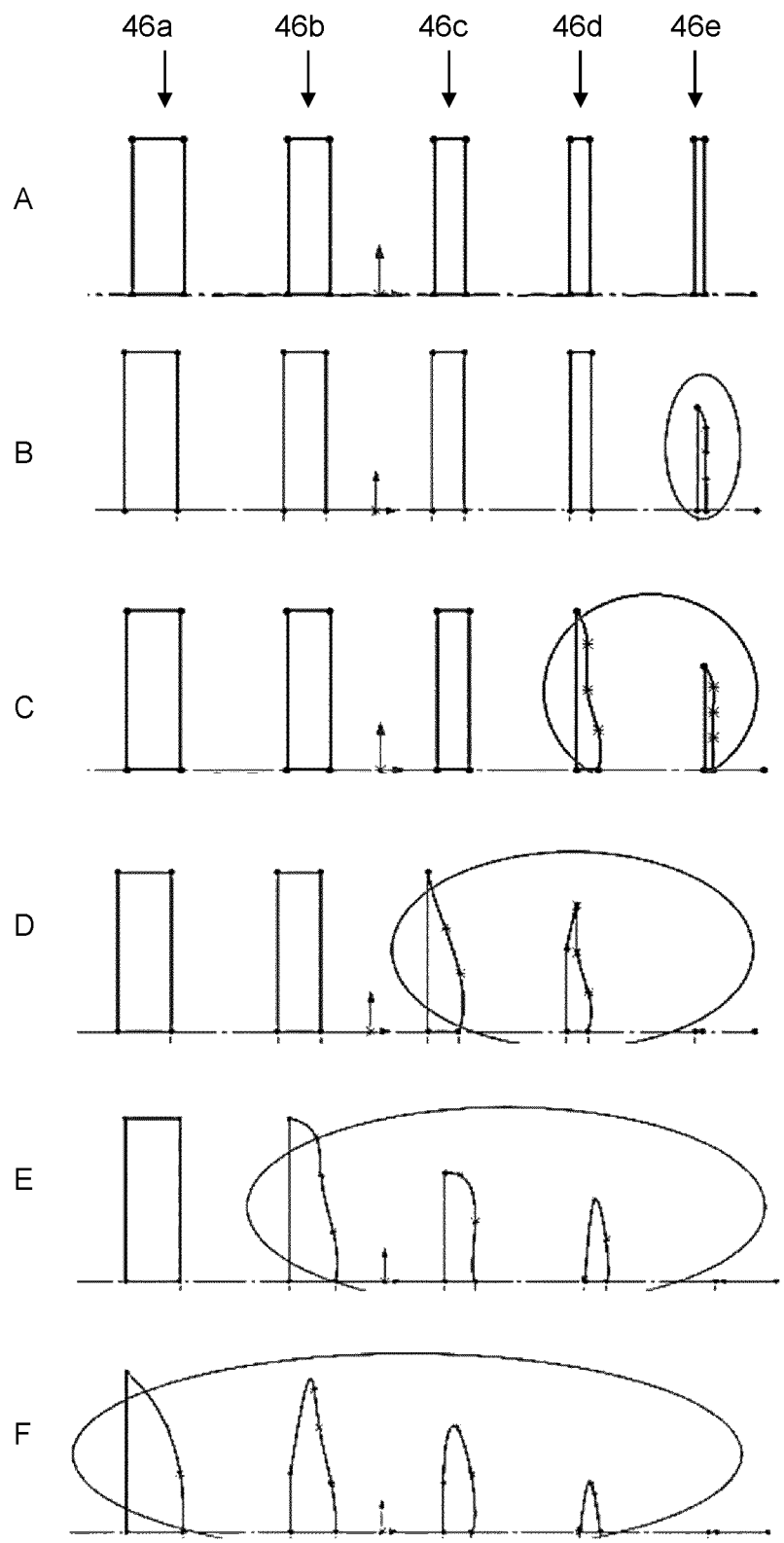
FIG. 6 shows how the protrusions may vary in response to injection mold shrinkage.

FIG. 6 shows how the protrusions of Table 1 may vary in response to injection mold shrinkage.

FIG. 6A shows no shrinkage at all. The produced product is perfect so no action needs to be taken.

FIG. 6B shows very slight shrinkage. It has affected the thinnest protrusion 46e, for which a height reduction can be visually seen. This may not affect the product, but it may be used to monitor the production carefully for any further issues.

FIG. 6C shows slight shrinkage. It has affected the thinnest two protrusions 46d, 46e, for which a height reduction can be visually seen. This may affect the product function and it may be used to trigger further photometric tests. The supplier quality engineer (SQE) may for example be informed.

FIG. 6D shows medium shrinkage. It has affected the thinnest three protrusions 46c, 46d, 46e. The thinnest has not been formed at all. This will affect the product function and may therefore trigger the need to inspect all products from the production line as well as conducting further tests.

FIG. 6E shows severe shrinkage and FIG. 6F shows very severe shrinkage.

It can be seen that the protrusions have a height which depends on the degree of shrinkage. Thus, as soon as a reduction in height is seen, an issue can be flagged. Different levels of performance of the injection molding process may be identified, based on a visual inspection of the set of protrusions, and identification of which protrusions have visible flaws. Appropriate remedial action, and further quality control measures and actions can then be taken.

The invention is of particular interest for large area components, for example with an area greater than 100 cm$^2$, for which it becomes difficult to assure the quality of the injection molding process, particular for components for which the shape of the functional portion is critical such as for lens plates. Another advantage is that larger products are of higher cost. The easy inspection method can help to identify any defects earlier, reducing the number of defective parts, which to be scrapped.

However, the invention may be applied to other products, and is of interest generally for the quality control of an injection molding process.

The invention also provides an injection molding method, comprising using an injection mold to form the component described above.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. An injection molded component, comprising:
a functional portion; and
a quality control portion,
wherein the quality control portion comprises at least one protrusion which is adapted to distort visibly in response to injection molding shrinkage, thereby to enable visual quality control inspection;
wherein the at least one protrusion comprises a set of protrusions of different susceptibility to deformation in response to injection molding shrinkage.

2. A component as claimed in claim 1, wherein the functional portion has a smooth surface.

3. A component as claimed in claim 2, wherein the functional portion comprises a lens element.

4. A component as claimed in claim 3, wherein the functional portion comprises an array of lens elements.

5. A component as claimed in claim 1, wherein the set of protrusions comprises protrusions each of different size.

6. A component as claimed in claim 1, wherein the set of protrusions comprises at least 3 different protrusions of the same height but different thickness, for example 5 different protrusion designs of the same height but different thickness.

7. A component as claimed in claim 6, wherein the different thicknesses each lie in the range 0.1 mm to 1.0 mm.

8. A component as claimed in claim 1, wherein the set of protrusions comprises at least 2 different protrusions of the same thickness but different heights.

9. A component as claimed in claim 8, wherein the different heights each lie in the range 1 mm to 5 mm.

10. A component as claimed in claim 1, wherein the at least one protrusion comprises a column with circular or rectangular cross section, in a plane perpendicular to a column height direction.

11. A component as claimed in claim 1 having an area greater than 100 cm$^2$.

12. A component as claimed in claim 1, comprising a lens plate for beam shaping LED light.

13. A luminaire comprising a housing, a LED light source arrangement mounted in the housing, and a lens plate for beam shaping of the LED light source arrangement light output, the lens plate comprising a component as claimed in claim 12.

14. An injection molding method, comprising using an injection mold to form a component having:
a functional portion; and
a quality control portion,
wherein the quality control portion comprises at least one protrusion which is adapted to distort visibly in response to injection molding shrinkage, thereby to enable visual quality control inspection; wherein the at least one protrusion comprises a set of protrusions of different susceptibility to deformation in response to injection molding shrinkage.

* * * * *